United States Patent [19]

Isoda et al.

[11] Patent Number: 4,795,622

[45] Date of Patent: Jan. 3, 1989

[54] METHOD FOR PRODUCING SILICON-IMIDE

[75] Inventors: Takeshi Isoda, Niiza; Mikiro Arai, Iruma, both of Japan

[73] Assignee: Toa Nenryo Kogyo Kabushiki Kaisha, Japan

[21] Appl. No.: 855,453

[22] Filed: Apr. 24, 1986

[51] Int. Cl.$^4$ .................... C01B 21/082; C01B 21/068
[52] U.S. Cl. ........................................ 423/324; 346/2; 346/3; 346/14; 423/344
[58] Field of Search .................. 546/2, 3, 14; 423/324

[56] References Cited

U.S. PATENT DOCUMENTS

| | | | |
|---|---|---|---|
| 3,565,936 | 2/1971 | Morehouse | 546/14 |
| 4,387,079 | 6/1983 | Kasai et al. | 423/342 |
| 4,663,314 | 5/1987 | Hayase et al. | 546/14 |
| 4,670,423 | 6/1987 | Böshagen et al. | 546/14 |

*Primary Examiner*—Robert T. Bond

[57] ABSTRACT

A silicon halide, preferably $SiCl_4$, is reacted with an excess of a base, e.g. a Lewis base or Brønsted base with steric hindrance group to produce an adduct. The adduct, which need not be separated, is treated with ammonia gas to produce the imide of silicon. A light organic solvent is used. The temperature used is $-78°$ C. to $100°$ C. and the reaction is rapid.

Byproduct ammonium halide is removed, and the imide is heated at $1000°$ C. to $1600°$ C. in an oven in an atmosphere containing nitrogen, to produce silicon nitride of good sintering characteristics and more than 70 wt % of which is of the α-crystal form.

6 Claims, 6 Drawing Sheets

METHOD FOR PRODUCING SILICON-IMIDE

BACKGROUND OF THE INVENTION (a) Field of the Invention

This invention relates to a method for producing silicon-imide, which is useful as a precursor of silicon nitride.

(b) Prior art description

Sintered silicon nitride is one of the most important material which is able to use as heat resistant structural material for gas turbines and diesel engines, and as high performance material (which is usefull for saving energy or for saving resources) for cutting tool, since it is superior in strength and shock resistance at high temperature, and also in corrosion resistance.

So far, the following four methods have been adopted widely for the production of silicon nitride.

① A direct nitridation of silicon by heating metal silicon with catalysis at 1300° C.-1500° C. in nitrogen or ammonia.

② A silica reducing method in which is produced by a reduction of silica in nitrogen—the reduction of silica is carried out by heating silica or materials containing silica with carbon in an atmosphere of nitrogen or by the reduction reation with urea.

③ A gas phase synthesis in which silicon tetra-chloride reacts with ammonia directly at high temperature.

④ An imide-amide heat decomposition method in which silicon-imide or silicon-amide is obtained by direct ammonolysis of silicon tetra-chloride and then heating the results in a non-oxidative atmosphere to produce silicon nitride.

These processes, however, have many defects as described below.

In the case of the above mentioned method ①, not only is the reaction time long and heating process complicated, but also the main product is β-type silicon nitride which was rough and contained many impurities.

In the case of the above mentioned method ②, it is difficult to purify the raw materisls, and in addition, the reaction time is long and produced material has binary system of both α-type silicon nitride and β-type silicon nitride.

In the case of ③, since the produced silicon nitride is generally amorphous, not only is a further process for crystallization to obtain α-type silicon nitride necessary but also it is complicated to deal with the chlorine which is a by-product at the high temperature reaction.

In the case of ④, although there is the advantage that it is able to produce α-type silicon nitride of high purity in a good yield, but the flow line of the reaction apparatus is apt to be choked up when silicon-imide or silicon-amide is formed, in addition, there is a defect that it is difficult to control the rapid exothermic reaction.

Furthermore, a method to obtain sintered silicon nitride by heating polysilazane at 800° C.-2000° C., which has been prepared by pyrolyzing organopolysilazane, was recently proposed (Hajime Saito, Seni Gakkaki Shi, 38 No. 1, 65-72 (1982)). But, this method had the defect of producing silicon carbide and free carbon together with the silicon nitride.

In the method ④ described above, it was a significant problem to prepare easily silicon-imide or silicon-amide with high purity.

As the result of our investigations, we found that by preparing an adduct which is easily formed from the reaction of a halosilane (which is purified easily) with a base, then carrying out the ammonolysis quantitatively on said adduct, a pure silicon-imide and a derived silicon nitride powder of high purity can be obtained, since not only are no catalysts such as Fe and Ca necessary and no residues such as the base remain, but also it was also very easy to remove the chlorine.

Consequently, the object of the present invention is to provide an easy method to prepare silicon-imide (silicon-amide may also be contained), which is useful as a precursor of silicon nitride powder.

The present invention thus comprises a method of synthesizing silicon-imide, as a precursor for preparing silicon nitride powder, wherein an adduct is formed by making the halosilane to react with a base and then reacting the adduct with ammonia.

DETAIL DESCRIPTION OF THE INVENTION

Figure 1:
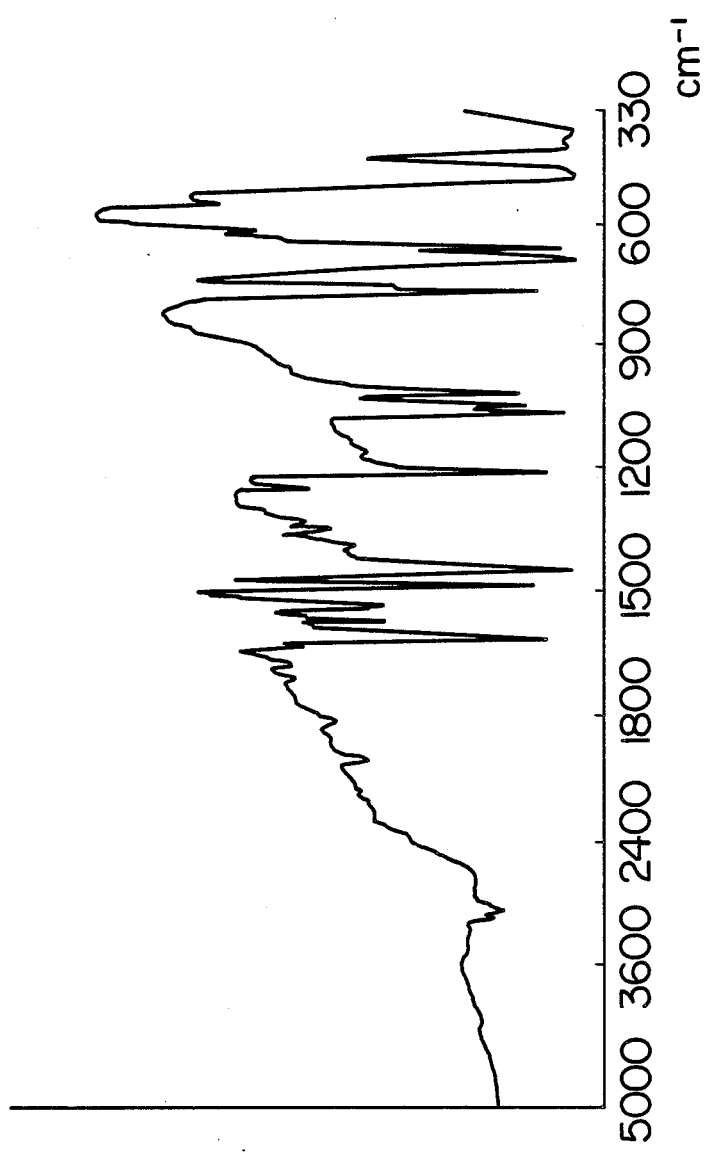
FIG. 1 shows the infrared absorption spectrum of a tetrachlorosilane-pyridine adduct obtained in Preparative Example.

The halosilane used can be arbitrarily selected from compounds of the formula $SiH_mX 4 - m$ where $X=F$, Cl, Br or I, and mixtures thereof; tetrachlorosilane is preferably used.

The base used in the present invention can be selected from bases which are able to form adducts with halosilane; bases which do not react other than with halosilane to form an adduct are preferable. Examples of these bases are Lewis base tertiary amines (e.g., trialkyl amine such as trimethyl amine and triethyl amine, pyridine, picoline and derivatives thereof), Br"ø"nsted base secondary amines which have steric hindrance group, Lewis base phosphine, stibine, arsine and derivatives of them (e.g., a trialkyl derivative such as trimethyl-phosphine, dimethylethyl-phosphine, methyl-diethyl-phosphine, triethyl-phosphine, trimethyl-arsine and trimethyl-stibine). Bases having a low boiling point and smaller basicity than ammonia (e.g., pyridine, picoline, trimethyl-phosphine, dimethylethyl-phosphine, methyl-diethyl-phosphine, triethyl-phosphine) are preferable, but pyridine and picoline are the most preferable since they are inexpensive and also easy to treat.

The quantity of the base need not be large but it should be a larger amount that the stoichiometric amount of halosilane.

Many kinds of solvents can be used for the reaction. Light solvents (e.g., hexane, benzene, pyridine, methanechlorides, ether, acetonitrile) are preferable; pyridine and methanechlorides are the most preferable.

The adduct of the halosilane can be formed by the conventional method; this adduct is formed as a reaction intermediate, which may not be necessary to be separated before further reaction.

The silicon-imide of the present invention is synthesized by the reaction of the said adduct with ammonia, e.g. as ammonia gas. The quantity of ammonia need not be high but it should be larger amount than the stoichiometric amount of silicon.

The reaction temperature to form silicon-imide in the present invention is from $-78°$ C. to $100°$C., preferaby from $-40°$C. to $80°$ C. As for reaction time and reaction pressure, they can be selected over a wide range since the reaction rate is very high. If the reaction temperature is lower than $-78°$ C., reaction rate becomes small and if the reaction temperature is higher than $100°$ C., produced silicon-imide is decomposed again, therefore, these conditions should not be selected.

The described reaction to synthesize the silicon-imide is preferably carried out in an atmosphere of inert gas, preferably nitrogen or argon.

In an optional further step, by carrying out heat treatment in the presence of nitrogen after separating the ammonium halide from the the reaction temperature is lower than $-78°$ C., reaction rate becomes small and if the reaction temperature is higher than $100°$ C., produced silicon-imide is decomposed again, therefore, these conditions should not be selected.

The described reaction to synthesize the silicon-imide is preferably carried out in an atmosphere of inert gas, preferably nitrogen or argon.

In an optional further step, by carrying out heat treatment in the presence of nitrogen after separating the ammonium halide from the silicon-imide by a suitable method (e.g., liquid ammonia washing or sublimation), the silicon-imide (even if it may contain the silicon-amide) obtained in the method described above can be converted into silicon nitride containing a high ratio of $\alpha$-type crystal form and of high purity—it is possible to make silicon nitride having more than 70% of $\alpha$-type crystal form.

The phase "in the presence of nitrogen" herein means an atmosphere of ammonia, nitrogen, a mixed gas of nitrogen and an inert gas such as a mixture of nitrogen and hydrogen, nitrogen and ammonia, nitrogen and argon or an atmosphere of gases produced by the decomposition of a compound containing nitrogen (e.g., ammonia); nitrogen is always necessary. The ratio of the mixed gases is not restricted, but a nitrogen rick mixed gas is preferable.

Generaly, it is preferable that silicon nitride used as raw powder for sintered silicon nitride has $\alpha$-type crystal form and has high purity, since the $\alpha$-phase is trasferred to $\beta$-phase during the sintering, which improves sintering characteristics and the development of a textile-like structure, resulting in sintered silicon nitride having high strength.

To make silicon nitride powder (more than 70% of which is the $\beta$-type crystal form and has excellent sintering characteristics) in a high yield using the silicon-imide obtained in the present invention, the treating temperature range should be from $1000°$ C. to $1600°$ C. When the treating temperature is low (e.g., lower than $500°$ C.), the obtained silicon nitride contains too much chlorine or hydrogen. On the other hand, if the treating temperature is higher than $1900°$ C., the produced silicon nitride may be decomposed. If the treating temperature range is from $700°$ C. to $1000°$ C., the main product should be a mixture of amorphous silicon nitride and silicon, and if the temperature range is from $1600°$ C. to $1900°$ C., the main product should be $\beta$-type silicon nitride.

The treating time can be roughly determined by observing the gas which is formed by a by-product when the silicon-imide is heated. Generally, the time is rather shorter at higher temperature and rather longer at lower temperature, but preferably it is from about 0.1 to about 20 hours and a time from about 0.1 to about 16 hours is the best.

As a material of an oven wall with which the silicon-imide contacts the atmosphere of nitrogen at high temperture, it is preferable to select non-oxidative materials, such as silicon nitride, silicon carbide, carbon, tantalum, molybdenum.

The above mentioned conditions make it possible to obtain pure silicon nitride having more than 70% of $\alpha$-type crystal form and containing more than 39% of nitrogen and less than 0.001% of chlorine. However, there; the silicon nitride may contain elements such as Mg, Y, Al, Fe or B which are known as elements able to contribute to sintering, if necessary.

The following examples are set forth for the purpose of illustration so that those skilled in the art may better understand this invention. It should be understood that they only examplary only, and should not be construed as limiting the invention in any way.

PREPARATIVE EXAMPLE

Synthesis of Adduct between Tetra-chloride and Pyridine

A three-neck flask (200 ml) having mechanical stirrer, condenser and dropping funnel was purged with nitrogen gas, then 20 ml of dried pyridine and 80 ml of dried di-chloromethane were introduced in the flask and maintained at room temperature. Next, by adding 10 ml of silicon tetra-chloride from dropping funnel, about 80 ml of white slurry of adduct was obtained. After a removal of residual reactants and solvent under a reduced pressure ($55°$ C. and 5 mmHg), 27.9 g of powderlike solid product was obtained which corresponded to 97.6% of product yield based on the silicon tetra-chloride.

Figure 2:
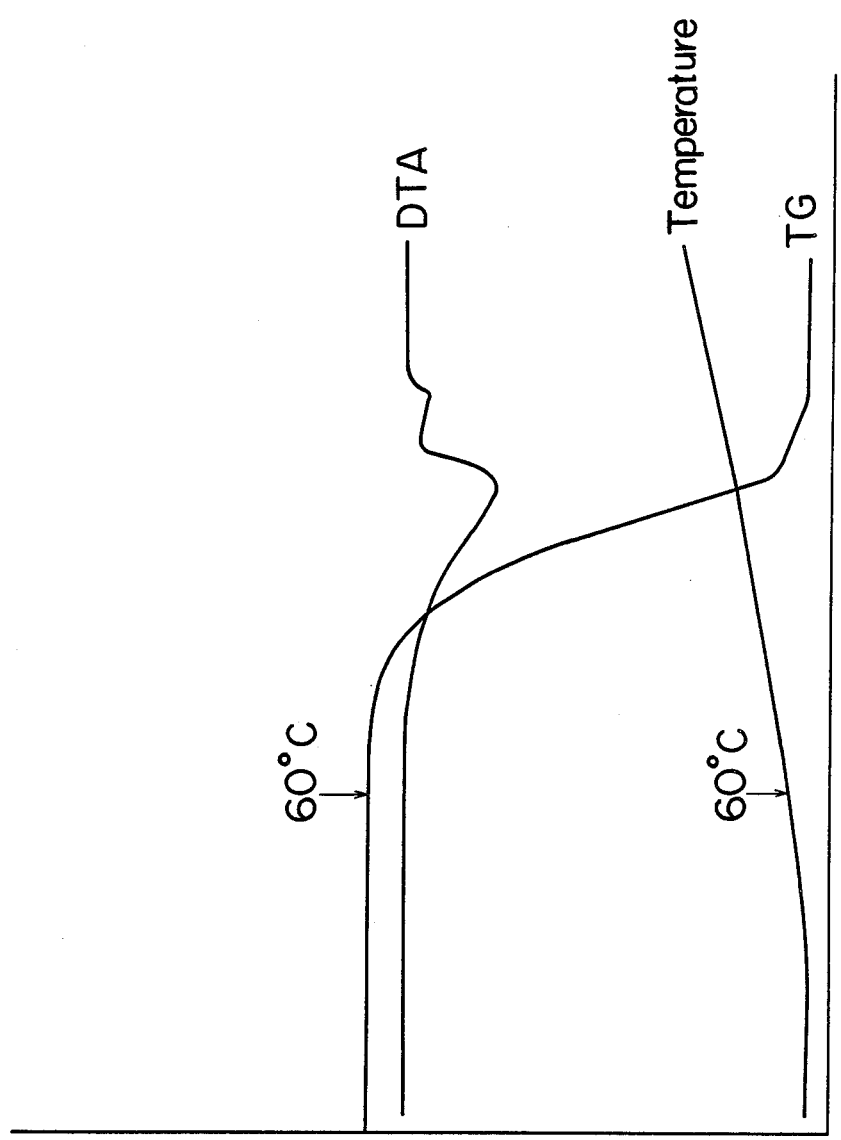
FIG. 2 shows the DTA curve (Differential thermal analysis) and the TG curve (Thermogravimetric analysis) of the tetrachlorosilane-pyridine adduct obtained in Preparative Example.

IR spectrum of the solid product was same to those of adduct between silicon tetra-chloride and pyridine shown in the article by H.J. Champbell-Ferguson et al., J. Chem. Soc. (A), 705–712, (1967) as illustrated in FIG. 1. Although, a peak at 1485 cm$^{-1}$ is not described in the article, it was confirmed as one of the peak of pyridinium salt. Thermal decomposition of the product started at $60°$ C. as shown in FIG. 2, which was a result of thermal analysis of the product.

EXAMPLE 1

Synthesis of Silicon-imide Ammonium-chloride Mixture through an Adduct between Silicon Tetra-chloride and Pyridine A four-neck flask (200 ml) having a gas inlet tube, mechanical stirrer, Dewar condenser and dropping funnel was purged with nitrogen gas, then 20 ml of dried pyridine and 80 ml of dried di-chloromethane were introduced in the flask and maintained at ordinary temperature. Next, by adding 10 ml of silicon tetra-chloride from the dropping funnel, about 80 ml of a white slurry was obtained. While agitaing the reaction mixture vigorously at about 16° C. to about 18° C., 10.2 g of ammonia which was diluted with nitrogen was introduced in the flask over a period of 1.5 hours to 2 hours. When the reaction was finished, then residual reactants and the solvent were removed under a reduced pressure (53° C. and 5 mmHg), and 23.3 g of solid product was obtained which corresponded to 98.5% of product yield based on the silicon tetrachloride. No fume was observed in any reaction, therefore both gas flow tube and ammonia inlet were never choked.

Figure 3:
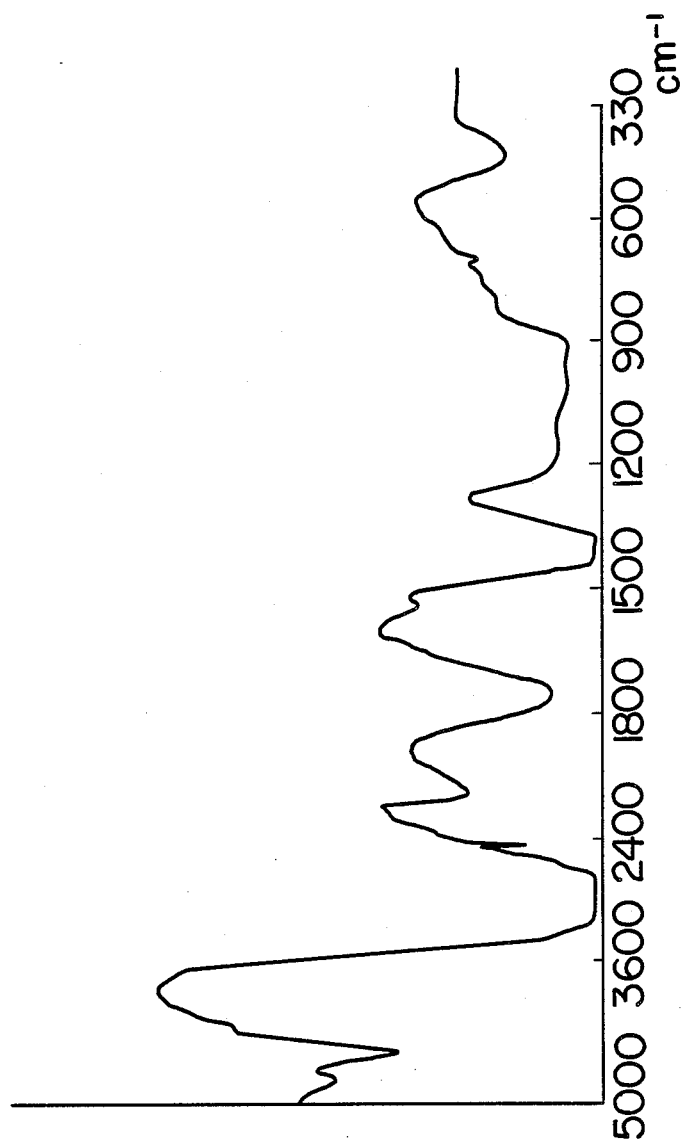
FIG. 3 shows the infrared absorption spectrum of the mixture obtained in Example 1, which contains silicon-imide and ammonium chloride.
Figure 4:
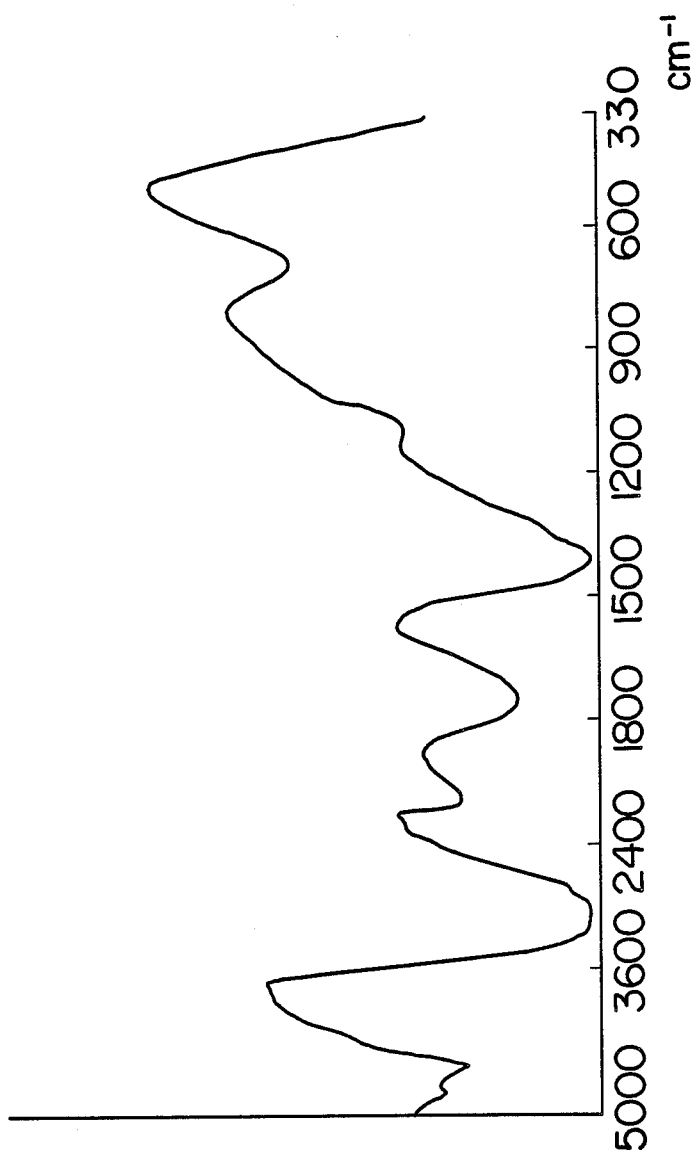
FIG. 4 shows the infrared absorption spectrum of commercial ammonium chloride, for comparison.

The IR spectra of the product and that of an ammonium chloride for a comparison are shown in FIGS. 3 and 4 respectively.

COMPARATIVE EXAMPLE 1

Synthesis of Silicon-imide Ammonium-chloride Mixture by Introducing Ammonia Gas into Liquid Silicon Tetra-chloride A three-neck flask (300 ml) having a gas inlet tube, mechanical stirrer and Dewar condenser was purged with nitrogen gas, then 10 ml of silicon tetra-chloride and 200 ml of dried carbon tetra-chloride were introduced in the flask and maintained at 15° C. Next, while agitating the mixed solution vigorously, 10.2 g of dried ammonia diluted with nitrogen was introduced in it during 1.5 hours. Fumes formed until the reaction ceased and deposited on the wall of the gas flow passage. Consequently the ammonia inlet was often choked and was opened by increasing a pressure of diluent nitrogen. The product stuck fast to the inner surface of the flask. After completion of the reaction, residual reactants and solvent were removed under a reduced pressure (50° C. and 5 mmHg), and 10.9 g of solid product was obtained, which meant 46.1% of product yield based on the silicon tetra-chloride. From this result, it is confirmed that the reaction yield in the method of Comparative Example 1 is much lower than that in the method of the present invention (EXAMPLE 1).

COMPARATIVE EXAMPLE 2

Synthesis of Silicon-imide Ammonium-chloride Mixture by the Direct Reaction of Silicon Tetra-chloride with Ammonia A reaction vessel (100 ml) was cooled by a mixture of dry ice-methanol, then 10 ml of silicon tetra-chloride was introduced in it and maintained at a temperature lower than −34° C. Next, 10.5 g of dried ammonia mixed with nitrogen was introduced over 1.5 hours. As soon as a reaction was started, solid product deposited on the liquid surface of said silicon tetra-chloride. Moreover the solid product stuck fast around the inlet for ammonia. After introduction of all ammonia, a part of reactants was still remained. After completion of the reaction, residual reactants and solvent were removed under a reduced pressure (50° C. and 5 mmHg), and 11.3 g of solid product was obtained, which meant 47.8% of product yield based on the silicon-tetra-chloride.

Figure 5:
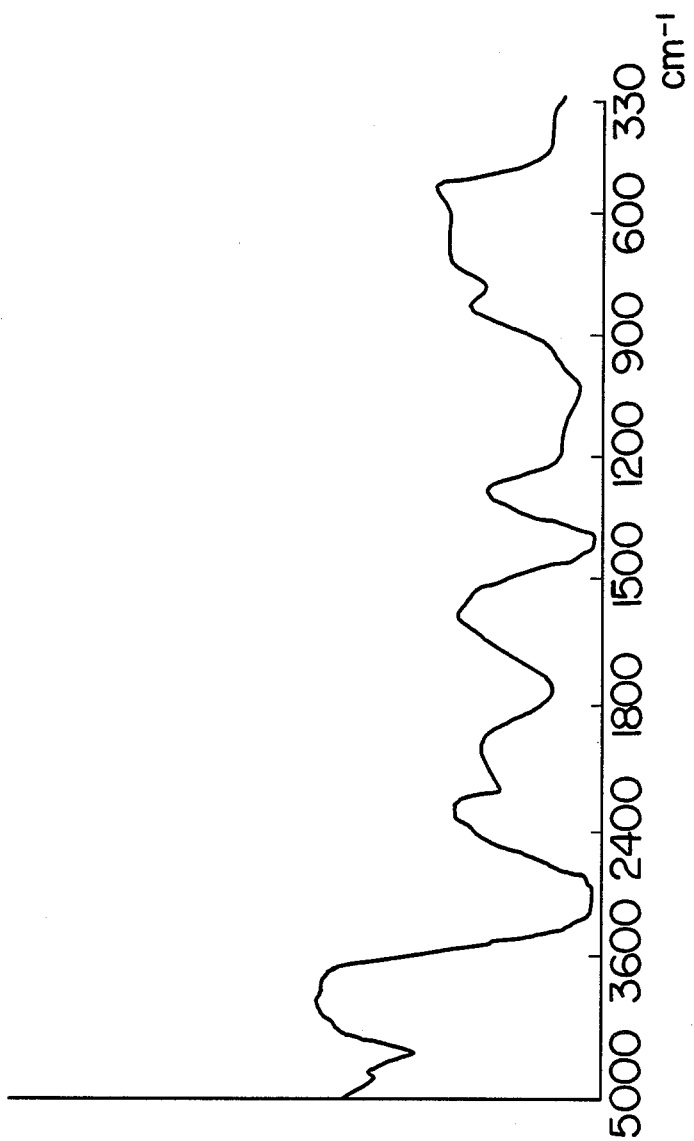
FIG. 5 shows the infrared absorption spectrum of the mixture obtained in Comparative Example 2, which contains silicon-imide and ammonium chloride.

FIG. 5 shows the IR spectrum of the product which is in good consistent with that of the product obtained in Example 1 of this invention. However, fumes had been formed since the reaction was started, and it was confirmed that fume product was deposited fast on the wall of the exhaust passage and so that the product yield was much lower than that of the present invention.

COMPARATIVE EXAMPLE 3

Synthesis of Silicon-imide Ammonium-chloride Mixture by Direct Reaction of Silicon Tetra-chloride with Ammonia (at room temperature)

The same experiment was carried out except that the reaction vessel was cooled by water at 17° C. White fumes were formed as soon as the reaction started and were deposited on the wall of exhaust pass. Moreover, the ammonia inlet was choked four times and the solid product had to be removed by a glass bar to continue the reaction. After introduction of all ammonia, the reactants still remained. After completion of the reaction, residual reactants and the solvent were removed under a reduced pressure (50° C. and 5 mmHg), and 5.6 g solid product was obtained, which corresponded to 23.5% of product yield based on the silicon tetra-chloride. This result proves that the method of the present invention is superior to the method of this Comparative Example 3.

Thermal Analysis of Silicon-imide Ammonium Chloride Mixture Obtained in the Example 1

Figure 6:
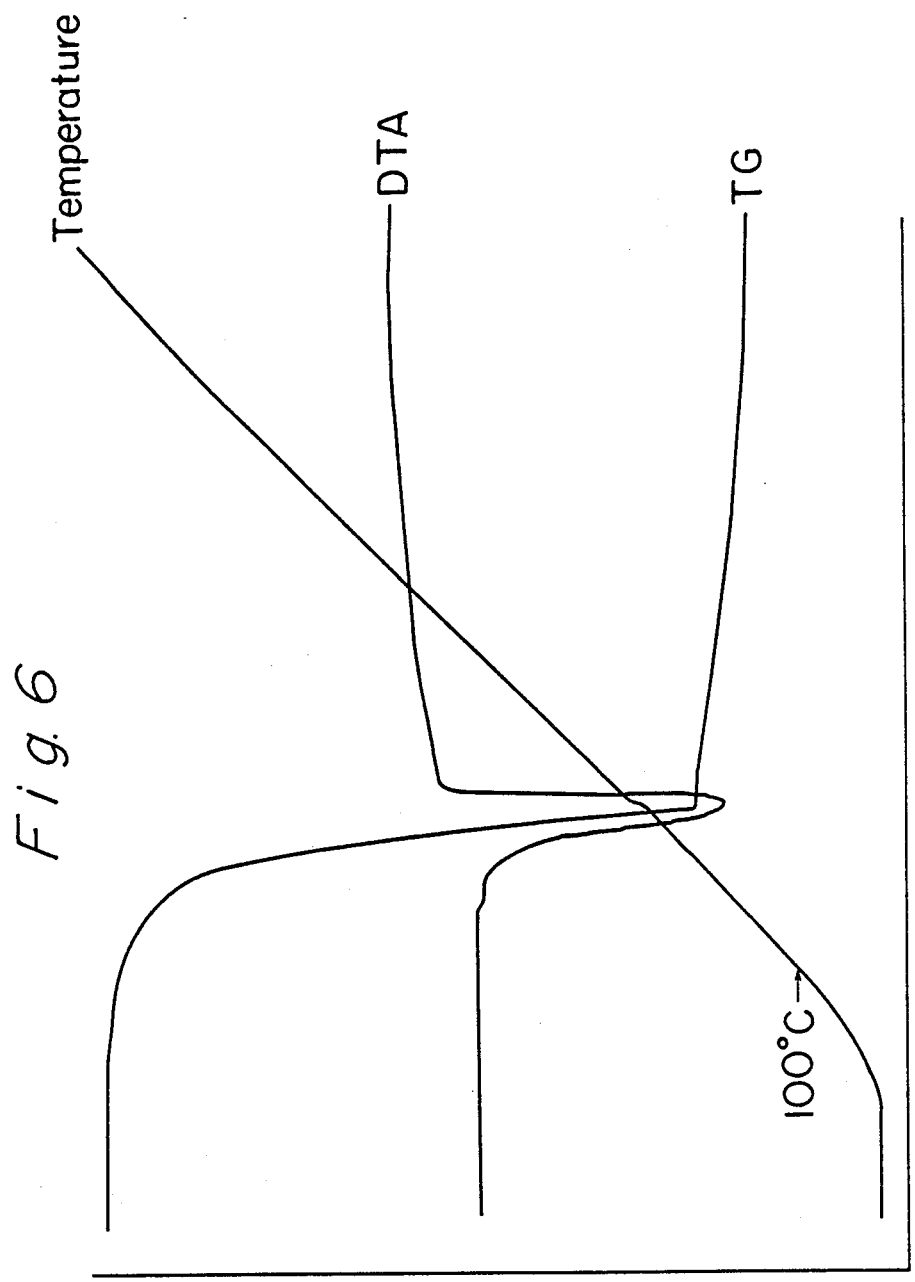
FIG. 6 shows the DTA curve and the TG curve of the mixture obtained in Example 1, which contains silicon-imide and ammonium chloride.

Thermogravimetric analysis and differential thermal analysis were carried out in the nitrogen gas flow using 9.27 mg of silicon-imide ammonium chloride mixture obtained in Example 1. The heating rate from room temperature to 1300° C. was 10° C./minute. As is shown in the FIG. 6, ammonium chloride sublimated at around 300° C., and 76.79% of the mass was decreased. The residue at 1000° C. was 1.65 mg which corresponds to 17.8% of the initial sample. Assuming that a composition of the sample which had been used for analysis was stoichiometric (Si(NH) 2·4NH$_4$Cl), the values above described were calculated as 78.6% and 17.2% respectively. Both values coincide very well with each other, considering that the character of the sample was unstable in the air. This result illustrates that the method of the present invention is excellent to produce silicon-imide quantitatively.

INDUSTRIAL APPLICABILITY

The present invention is very useful to produce silicon-imide as a precursor of silicon nitride, since this product can be produced through the reaction of said adduct and ammonia is very stable in the reaction solvent. Namely, according to the present invention all defects such as loss of silicon halide and choking up of an apparatus can be avoided. For these reasons not only the reaction temperature in the method of the present invention can be raised more than under ordinary conditions but also the concentration of silicon halide in the reaction mixture can be increased without accompanying dangers such as poisoning and firing. Therefore, by the present invention silicon-imide can be produced in good efficiency by using simple apparatus.

What is claimed is:

1. A method for producing silicon-imide suitable for use as a precursor of sintered silicon nitride, comprising the steps of contacting a halosilane selected from the group consisting of compounds expressed by the formula:

(wherein X is at least one halogen selected from the group consisting of F,Cl,Br and I: m is 0–3), with an organic base to form a halosilane adduct; and then reacting the obtained adduct with ammonia in a solvent; said organic base being selected from the group consisting of pyridine and picoline.

2. The method according to claim 1, wherein the halosilane is a trihalosilane expressed by $SiHX_3$; or a tetrahalosilane expressed by the general formula $SiHX_4$ in which X is selected from the group consisting of F,Cl,Br or I.

3. The method according to claim 2, wherein the tetrahalosilane is tetrachlorosilane.

4. The method according to claim 1, wherein the solvent is at least one solvent selected from a group consisting of a hexane, benzene, pyridine, chloromethane, an ether or acetonitrile.

5. The method according to claim 4, wherein the solvent is pyridine or chloromethane.

6. The method according to any one of the preceding claims, wherein the reaction temperature is from $-40°$ C. to $80°$ C.

* * * * *